US012130723B2

United States Patent
Åberg et al.

(10) Patent No.: US 12,130,723 B2
(45) Date of Patent: Oct. 29, 2024

(54) SOFTWARE EXECUTION MONITORING USING NEURAL NETWORKS

(71) Applicant: Telefonaktiebolaget LM Ericsson (PUBL), Stockholm (SE)

(72) Inventors: Patrik Åberg, Södra Sandby (SE); Magnus Templing, Staffanstorp (SE); Victor Millnert, Malmö (SE)

(73) Assignee: Telefonaktieabolaget LM Ericsson (Publ), Stockholm (SE)

( * ) Notice: Subject to any disclaimer, the term of this patent is extended or adjusted under 35 U.S.C. 154(b) by 66 days.

(21) Appl. No.: 17/780,589

(22) PCT Filed: Dec. 18, 2019

(86) PCT No.: PCT/EP2019/085962
§ 371 (c)(1),
(2) Date: May 27, 2022

(87) PCT Pub. No.: WO2021/121576
PCT Pub. Date: Jun. 24, 2021

(65) Prior Publication Data
US 2023/0350784 A1    Nov. 2, 2023

(51) Int. Cl.
*G06F 11/36* (2006.01)
*G06F 11/07* (2006.01)
*G06V 10/82* (2022.01)

(52) U.S. Cl.
CPC ...... *G06F 11/3612* (2013.01); *G06F 11/0766* (2013.01); *G06V 10/82* (2022.01)

(58) Field of Classification Search
None
See application file for complete search history.

(56) References Cited

U.S. PATENT DOCUMENTS 5,475,843 A * 12/1995 Halviatti ............ G09B 19/0053
                                                        719/329
5,999,942 A * 12/1999 Talati ................... G06F 16/972
(Continued)

FOREIGN PATENT DOCUMENTS

| CN | 101212533 A | 7/2008 |
|---|---|---|
| GB | 2 466 078 A | 6/2010 |
| TW | 201737178 A | 10/2017 |

OTHER PUBLICATIONS

Long Cheng et al., Checking is Believing: Event-Aware Program Anomaly Detection in Cyber-Physical Systems—Mar. 25, 2019.
(Continued)

*Primary Examiner* — Qing Chen
(74) *Attorney, Agent, or Firm* — Weisberg I.P. Law, P.A.

(57) ABSTRACT

A software monitoring arrangement (100) comprising a controller (101) configured to: a) receive a software code module (215); b) introduce a plurality of probes (211) into the software code module (215), each probe (211) being arranged to provide output (212) when executed; c) execute the software code module (215) generating an image log file (213) based on the output (212) of the probes (211); d) provide image analysis (221) of the image log file (213); e) provide an indication (222) of an expected behavior based on the image analysis (221); f) receive an indication (216) of an actual behavior; g) compare the expected behavior as indicated by its indicator (222) to the actual behavior as indicated by its indicator (216); and provide an alert (231) based on the comparison.

10 Claims, 4 Drawing Sheets

(56) References Cited

U.S. PATENT DOCUMENTS

| | | | |
|---|---|---|---|
| 2003/0056200 A1* | 3/2003 | Li | G06F 11/323 |
| | | | 714/E11.181 |
| 2005/0086630 A1* | 4/2005 | Chefalas | G06F 11/366 |
| | | | 717/100 |
| 2010/0149185 A1 | 6/2010 | Capewell et al. | |
| 2012/0131386 A1* | 5/2012 | Fournier | G06F 11/263 |
| | | | 714/35 |
| 2017/0123875 A1 | 5/2017 | Craik et al. | |
| 2019/0258564 A1 | 8/2019 | Parthasarathy et al. | |
| 2019/0318648 A1* | 10/2019 | Zhang | G06N 3/08 |
| 2020/0097579 A1* | 3/2020 | Manjappa | G06F 16/2358 |

OTHER PUBLICATIONS

Fangzhou Sun et al., A Feasibility Study of Autonomically Detecting In-process Cyber-Attacks, IEEE—2017.

Fabian Huch et al., Machine Learning-Based Run-Time Anomaly Detection in Software Systems: An Industrial Evaluation—Mar. 2018.

PCT International Search Report issued for International application No. PCT/EP2019/085962—Oct. 2, 2020.

PCT Written Opinion of the International Searching Authority issued for International application No. PCT/EP2019/085962—Oct. 2, 2020.

Tom Janssen et al., Zoltar: A Spectrum-based Fault Localization Tool—Aug. 25, 2009.

Notice of Review Opinion issued by the Taiwanese Intellectual Property Bureau of the Ministry of Economic Affairs for Patent Application No. 109144771—Nov. 29, 2021.

\* cited by examiner

SOFTWARE EXECUTION MONITORING USING NEURAL NETWORKS

PRIORITY

This nonprovisional application is a U.S. National Stage Filing under 35 U.S.C. § 371 of International Patent Application Serial No. PCT/EP2019/085962 filed Dec. 18, 2019 and entitled "A COMPUTER SOFTWARE MODULE ARRANGEMENT, A CIRCUITRY ARRANGEMENT, AN ARRANGEMENT AND A METHOD FOR IMPROVED SOFTWARE EXECUTION MONITORING" which is hereby incorporated by reference in its entirety.

TECHNICAL FIELD

The present invention relates to an arrangement, an arrangement comprising computer software modules, an arrangement comprising circuits, a device and a method for providing an improved manner of software execution monitoring, and in particular to an arrangement, an arrangement comprising computer software modules, an arrangement comprising circuits, a device and a method for providing an improved manner of software execution monitoring using neural networks.

BACKGROUND

As computer and processing power grows, so does the application and the complexity of computer software. To develop and ensure a correct operation (testing and debugging) several techniques and tools have been developed. Debugging is often used to ensure that software is able to compile and execute without errors, while testing is used to verify that a software program is able to execute and produce the correct results without crashing. Two main techniques for ensuring the correct execution of a program are (event) logging and tracing.

Logging is the act of keeping a log and a log file is a file that records either events that occur in an operating system or other software runs. Event logging provides system administrators with information useful for diagnostics and auditing. The different classes of events that will be logged, as well as what details will appear in the event messages, are often considered early in the development cycle. Many event logging technologies allow or even require each class of event to be assigned a unique "code", which is used by the event logging software or a separate viewer (e.g., Event Viewer) to format and output a human-readable message. This facilitates localization and allows system administrators to more easily obtain information on problems that occur. Event logging is used to log high-level information (often failure information).

Software tracing provides developers with information useful for debugging. This information is used both during development cycles and after the release of the software. Tracing is adapted to monitor low-level operation and is embedded into the actual code of the software program. The information logged in the trace indicates where the trace originates from, which enables a developer to understand how the code executes.

Both logging and tracing thus require a developer to analyze the software program both before and during its development to ensure that the relevant events are logged or that an understandable trace is produced. This is a big undertaking that requires large parts of the development resources and are also open to introduce errors as it is mainly human-operated. In addition, it requires substantial knowledge and experience to be able to correctly analyze both en event log and a trace to be able to identify an error in the software program's execution.

There is thus a need for a more efficient manner of both providing monitoring of software programs and for analyzing such monitoring.

SUMMARY

The inventors have realized that an automation would indeed be beneficial to both monitoring of software programs and of the analysis of such monitoring. The inventors have also realized that as the monitoring is to be automated, the exact nature of the log or trace need not be readable to a human developer and the inventors further realized that by insightfully changing the very nature of the data produced, other than the traditional analysis tools may be utilized. As will be shown below, this has provided an extremely simple and elegant manner for providing automated monitoring, solving the problem the problem of how to provide reliable monitoring that is easy to implement, a problem that has existed since the advent of modern software programs, i.e. a problem dating back to the previous century even.

The inventors have further realized that the most advanced analysis tools available are aimed at image analysis, and are thus proposing to insightfully produce an image as the output of the monitor, which image may be analyzed using image analysis tools, such as the many various neural network tools and techniques commonly used for image analysis.

An object of the present teachings is therefore to overcome or at least reduce or mitigate the problems discussed, by providing a manner of providing computer program monitoring by generating a visual or image log file which is analyzed using image analysis tools thereby taking advantage of the highly advanced technology available for image analysis.

According to one aspect a software monitoring arrangement is provided, the software monitoring arrangement comprises a controller configured to: a) receive a software code module; b) introduce a plurality of probes into the software code module, each probe being arranged to provide output when executed; c) execute the software code module generating an image log file based on the output of the probes; d) provide image analysis of the image log file; e) provide an indication of an expected behavior based on the image analysis; f) receive an indication of an actual behavior; g) compare the expected behavior as indicated by its indicator to the actual behavior as indicated by its indicator; and provide an alert based on the comparison.

The solution may be implemented as a software solution, a hardware solution or a mix of software and hardware components.

In one embodiment the image analysis tool is based on a neural network.

In one embodiment the controller is further configured to b2) train the image analysis tool after introducing the plurality of probes.

In one embodiment the controller is further configured to adapt at least one of the plurality of probes to provide an output providing a higher success rate of the image analysis tool during training.

In one embodiment the output of the probes relates to a characteristic of the image log file.

In one embodiment the controller is further configured to provide said image analysis to recognize a pattern in the image log file, which pattern is associated with the expected behavior.

In one such embodiment the controller is further configured to recognize a first pattern which first pattern is associated with a first expected behavior; recognize a second pattern which second pattern is associated with a second expected behavior; and to provide a first indication of the first expected behavior and a second indication of the second behavior.

In one embodiment the controller is further configured to: a1) receive a second software code module; b1) introduce a second plurality of probes into the second software code module, each probe being arranged to provide output when executed; c1) execute the second software code module generating a second image log file based on the output of the second plurality of probes; d1) provide image analysis of the second image log file; e1) provide a second indication of a second expected behavior based on the second image analysis; g1) compare the expected behavior as indicated by its indicator and the second expected behavior as indicated by its indicator to the actual behavior as indicated by its indicator; and provide an alert based on the comparison.

In one embodiment the image analysis tool is based on object detection. In one such embodiment the object detection is based on a Deep Neural Network model.

According to one aspect a method for use in a software monitoring arrangement is provided, the method being for providing a method for software monitoring as taught herein. The method comprises receiving a software code module and introducing a plurality of probes into the software code module, each probe being arranged to provide output when executed. The method further comprises executing the software code module or causing the software code module to be executed, generating an image log file based on the output of the probes. The method further comprises providing an image analysis of the image log file and providing an indication of an expected behavior based on the image analysis. The method further comprises receiving an indication of an actual behavior and comparing the expected behavior as indicated by its indicator to the actual behavior as indicated by its indicator, and providing an alert based on the comparison.

According to one aspect there is provided a computer-readable medium carrying computer instructions that when loaded into and executed by a controller of a software monitoring arrangement enables the software monitoring arrangement to implement a method according to herein.

According to one aspect there is provided a software component (or module) arrangement according to an embodiment of the teachings herein. The software component arrangement is adapted to be used in a software monitoring arrangement as taught herein for automated software monitoring as taught herein.

The software component arrangement comprises a software component for receiving a software code module. The software component arrangement also comprises a software component for introducing a plurality of probes into the software code module, each probe being arranged to provide output when executed. The software component arrangement also comprises a software component for executing the software code module and for generating an image log file based on the output of the probes. The software component arrangement also comprises a software component for providing image analysis of the image log file and a software component for providing an indication of an expected behavior based on the image analysis. The software component arrangement also comprises a software component for receiving an indication of an actual behavior and a software component for comparing the expected behavior as indicated by its indicator to the actual behavior as indicated by its indicator. The software component arrangement also comprises a software component for providing an alert based on the comparison.

According to one aspect there is provided an arrangement comprising circuitry for software monitoring according to an embodiment of the teachings herein. The arrangement comprising circuitry for software monitoring is adapted to be used in a software monitoring arrangement as taught herein for automated software monitoring.

The arrangement comprising circuitry for automated software monitoring comprises circuitry for receiving a software code module. The arrangement comprising circuitry for automated software monitoring also comprises circuitry for introducing a plurality of probes into the software code module, each probe being arranged to provide output when executed. The arrangement comprising circuitry for automated software monitoring also comprises circuitry for executing the software code module and for generating an image log file based on the output of the probes. The arrangement comprising circuitry for automated software monitoring also comprises a circuitry for providing image analysis of the image log file and a circuitry for providing an indication of an expected behavior based on the image analysis. The arrangement comprising circuitry for automated software monitoring also comprises a circuitry for receiving an indication of an actual behavior and a circuitry for comparing the expected behavior as indicated by its indicator to the actual behavior as indicated by its indicator. The arrangement comprising circuitry for automated software monitoring also comprises circuitry for providing an alert based on the comparison.

Further embodiments and advantages of the present invention will be given in the detailed description. It should be noted that the teachings herein find use in software monitoring arrangements in many areas of software monitoring.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 1A:
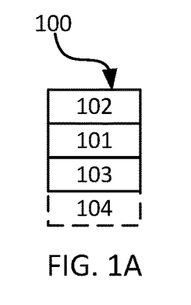
FIG. 1A shows a schematic view of a software monitoring arrangement according to an embodiment of the present invention.

FIG. 1A shows a schematic view of a software monitoring arrangement 100 according to an embodiment of the present invention. The software monitoring arrangement comprises a controller 101 and a memory 102. It should be noted that the software monitoring arrangement 100 may comprise a single device or may be distributed across several devices and apparatuses.

The controller 101 is configured to control the overall operation of the software monitoring arrangement 100. In one embodiment, the controller 101 is a general purpose processor. In one embodiment, the controller 101 is a combination of a graphics controller and a general purpose controller. As a skilled person would understand there are many alternatives for how to implement a controller, such as using Field-Programmable Gate Arrays circuits, AISIC, GPU, etc. in addition or as an alternative. For the purpose of this application, all such possibilities and alternatives will be referred to simply as the controller 101.

The memory 102 is configured to store data and computer-readable instructions that when loaded into the controller 101 indicates how the software monitoring arrangement 100 is to be controlled. The memory 102 may comprise one or several memory modules, partitions, allocations, units or devices, but they will be perceived as being part of the same overall memory 102. There may be one memory unit for storing data, one memory for the communications interface (see below) for storing settings, and so on. As a skilled person would understand there are many possibilities of how to select where data should be stored and a general memory 102 for the software monitoring arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. The memory 102 may also be an allocation of a larger memory partition. For the purpose of this application all such alternatives will be referred to simply as the memory 102.

In one embodiment the software monitoring arrangement 100 may further comprise a communication interface 103. The communication interface may be wired and/or wireless. The communication interface may comprise several interfaces.

In one embodiment the communication interface comprises a USB (Universal Serial Bus) interface. In one embodiment the communication interface comprises an analog interface, a CAN (Controller Area Network) bus interface, an I2C (Inter-Integrated Circuit) interface, or other interface.

In one embodiment the communication interface comprises a radio frequency (RF) communications interface. In one such embodiment the communication interface comprises a Bluetooth™ interface, a WiFi™ interface, a ZigBee™ interface, a REID™ (Radio Frequency IDentifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systéme Mobilé) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol.

In one embodiment, the communications interface 103 is configured to enable communication through more than one of the example technologies given above.

The communications interface 103 may be configured to enable the software monitoring arrangement 100 to communicate with other devices, such as other software monitoring arrangements 100 and/or smartphones, Internet tablets, computer tablets or other computers.

A user interface 104 may be comprised in the software monitoring arrangement 100. Additionally or alternatively, (at least a part of) the user interface 104 may be comprised remotely in the software monitoring arrangement 100 through the communication interface 103, the user interface then (at least a part of it) not being a physical means in the software monitoring arrangement 100, but implemented by receiving user input or providing user output through a remote device (not shown) through the communication interface 103. Examples of such a remote device are a mobile phone handset, a tablet computer or a computer.

Figure 1B:
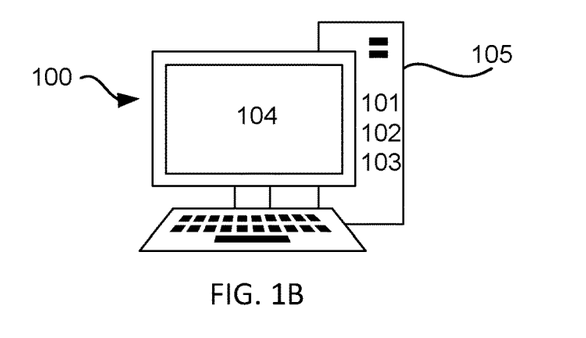
FIG. 1B shows a schematic view of a software monitoring arrangement according to an embodiment of the present invention.

FIG. 1B shows a schematic view of one such example of a software monitoring arrangement 100 according to an embodiment of the present invention. The software monitoring arrangement 100 in this example is a desktop computer (or work station) 100 comprising a housing 105 in which the controller 101, the memory 102 and the communication interface 103 is housed. The work station is in this example also provided with a user interface 104 comprising a display and a keyboard.

Figure 2:
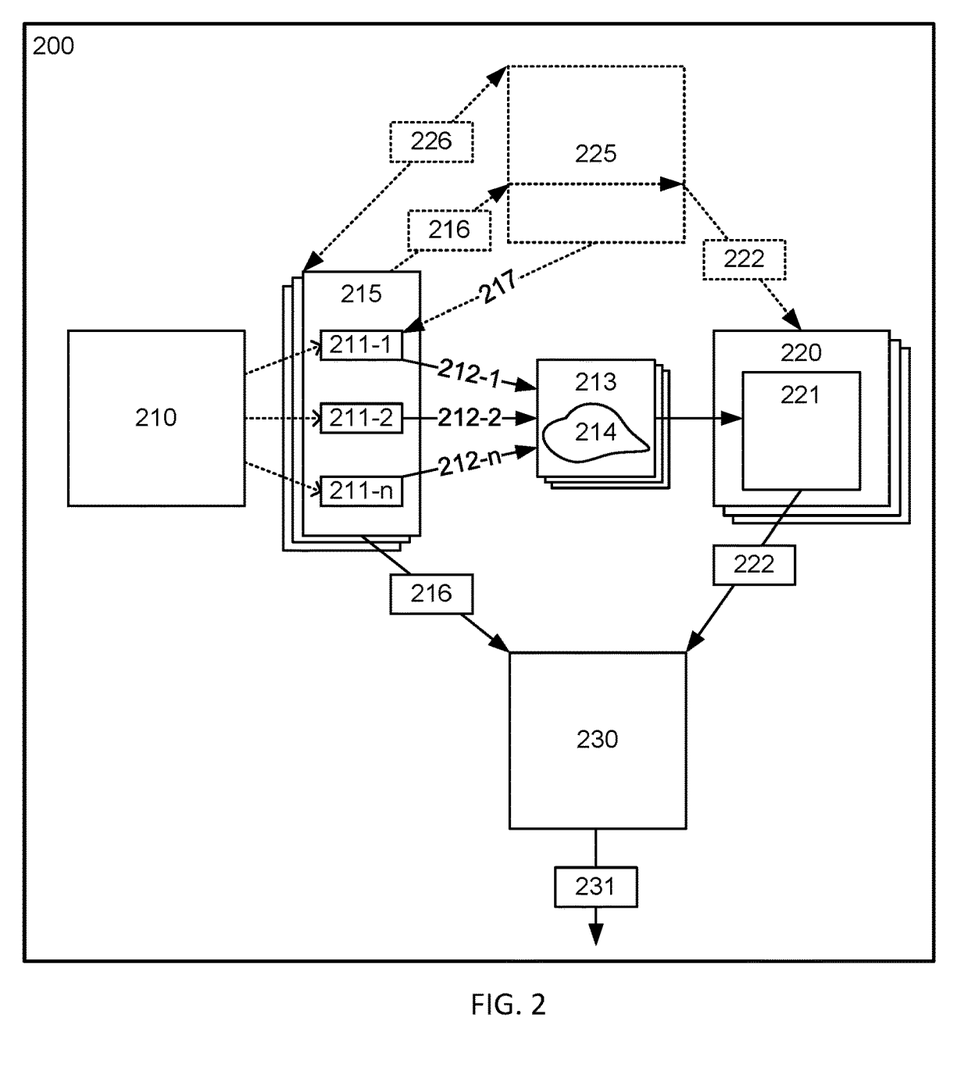
FIG. 2 shows a schematic view of a software monitoring model according to one embodiment of the teachings herein.

FIG. 2 shows a schematic view of a software monitoring model 200 comprised in a software monitoring arrangement 100 (i.e. showing the processing modules of the software monitoring arrangement 100) according to one embodiment of the teachings herein. The software monitoring model 200 is arranged to be executed by the controller 101 of a software monitoring arrangement 100 according to herein, a software component arrangement 400 according to herein, an arrangement comprising circuitry 500 according to herein or being utilized by a method according to herein. It should be noted that different parts of the software monitoring arrangement model may be executed by different parts of the corresponding executing arrangement.

The software monitoring model 200 comprises a probe generator module 210 that is arranged to introduce probes 211 in to the actual code of a software code module 215. A probe 211 is generally a piece of code that produces an output 212 every time the probe 211 is executed. In one embodiment the probe 211 is arranged to provide graphical data as the output 212. According to the present invention, the probes are introduced automatically into the code and at locations that are selected automatically by the probe generator module 210 and there is thus no need for manual interaction by a developer thereby both saving on resources and eliminating the risk of introducing (human) errors.

Furthermore, as the probes are introduced automatically there is little overhead in introducing more probes than would be necessary using human introduction. As more probes may be used at very little (if any) additional cost, the code may be covered more comprehensively and there is thus no need for knowledge of the purpose of the code to identify where to input probes and what the associated output of probe should be, as in previous systems. This provides for a significant reduction in the work effort needed to introduce the probes.

The software monitoring model 200 also comprises a sensor module 220 that is arranged to monitor the execution of a software code module 215. The sensor module 220 is therefore arranged to receive the output 212 generated by the probes 211. The output may be received as it is generated by the probes 211, and the sensor module 220 being arranged to collate the output and thereby providing an image log file 213 based on the received output 212. In additional or as an alternative embodiment, the probe generator module 210 provides the image log file 213 to the sensor module 220.

The sensor module 220 comprises an image analysis tool 221. As the sensor module 220 has received the image log file 213, the image log file is subjected to the image analysis tool 221 for determining a graphical pattern 214 in the image log file 213. The graphical pattern 214 is associated with a use case (such as a behavior or function of the computer software module 215). As a graphical pattern 214 is recognized, the sensor module is thus able to report an indication 222 of an expected behavior (i.e. the behavior of the associated use case) of the software code module 215. In one embodiment the image analysis tool 221 is a neural network, such as a Convolutional Neural Network. In one embodiment, the image analysis tool 221 is based on an object detection model, for example a deep learning neural network. In such an embodiment a pattern 214 may be seen as an object to be recognized.

The software monitoring model 200 also comprises a monitoring manager module 230 which receives the indication 222 of the expected behavior from the sensor module 220. The monitoring manager module 230 also receives an indication 216 of the actual behavior of the software code module 215, i.e. an indication of resulting behavior of the execution of the software code module 215. The monitoring manager module 230 is arranged to compare the expected behavior as indicated by its indication 222 to the actual behavior as indicated by its indication 216 and if there is a mismatch, the monitoring manager module 230 is arranged to issue an alert 231 to this effect. The alert is one embodiment designed to provide information on the discrepancy between the expected behavior and the actual behavior. The alert may also be issued even if there is a match, wherein the alert is an alert to this effect. The alert may also provide information on discrepancies deemed too small to not provide a match. The alert is thus provided based on the comparison.

The alert may be an external signaling to a user or operator, such as a textual, audio and/or visual output. Alternatively or additionally the alert may be an external signaling to another device, such as a computer-readable message or other manner of transmitting data between two devices. Such an alert may cause the receiving device to issue or provide further alerts. Alternatively or additionally the alert may be an internal signaling to another module or component of the same device. Such an alert may cause the receiver to issue or provide further alerts.

In one embodiment, the software monitoring model 200 also comprises a training module 225 for training the image analysis tool 221. The training module 225 is arranged to execute the software code module 215 with known input parameters 226. In one embodiment the input parameters 226 are provided by the training module 225. In one embodiment the input parameters 226 are provided to and stored by the training module 225, possibly for repeating a use case. The training module 225 also receives an indication 216 of the actual behavior of the execution and forwards this as the expected behavior 222 to the image analysis tool 221, thereby enabling the image analysis tool 221 to associate the pattern 214 of the image log file 213 with the behavior and establishing an association pattern—behavior for enabling the image analysis tool 221 to later provide an indication 222 of the expected behavior associated with a pattern 214.

As is indicated in FIG. 2, a software monitoring module may be applied to more than one software code module 215. This enables for a larger software package to be split up into several smaller software code modules that may be monitored separately, by each a sensor module 220, as several groups by several sensor modules 220 or any combination thereof.

It should be noted that more than one pattern 214 may be present in an image log file 213, in much the same way as more than one object may be present in an image. The teachings herein may thus be used to recognize more than one expected behavior at the same time, and is thus useful for monitoring also parallel processes.

Returning to the image log file 213 and the graphical output 212, in one embodiment the graphical data may relate to a location in a log image file. In one such embodiment the graphical data may relate to a characteristic of such a location in the log image file. Examples of such characteristics is the intensity, color, grey scale, contrast or brightness of the location. Examples of locations are pixels, groups of pixels, areas, or objects in the log image file.

In one embodiment, the image log file 213 is a matrix, where each element corresponds to a probe 211. The elements may be seen as corresponding to a characteristic of the image (intensity, color, grey scale, contrast or brightness). Each time a probe 211 is executed a value of the element is increased, thereby altering the characteristic of the element. In an embodiment, where each element corresponds to the greyscale of a corresponding pixel an often-executed probe 211 will generate a darker pixel, than a less-executed probe 211 would. Different images will thus be produced depending on how the software code module 215 is executed and different patterns will be discernible (at least to the image analysis tool 221) for different use-cases, which patterns can be associated with the results of the use-cases.

The inventors have thus provided for an ingenious manner of automatically monitor code, and for preparing the code to be monitored, that reduces the work effort required and completely reduces the risk of human errors to be introduced. This based on the brilliant realization to discard the notion of logs and instead utilize images that are to be analyzed by highly developed image analysis tools 221.

The inventors have also realized that since the probes 211 generate the output 212 resulting in the image log, the resulting image can be controlled to perfection as the probes 211 are generated by the software monitoring model 200. The probes 211 may thus be tuned during training so that an image log 213 that is optimum for image analysis (or at least provides the highest confidence result) is produced. If a probe setting provides a low success rate in recognizing patterns, the probes may be adjusted until a high (enough) success rate is achieved, i.e. a success rate exceeding a wanted success ratio. The manner of adjusting the probes, depend on the current image analysis tool used and details on this will not be given herein as that would render this text illegible.

The training module 225 is therefore, in one embodiment, also arranged to adapt the probes 211 in how the output 212 is generated. Factors that can fool or make it harder for the image analysis tool 221 to successively recognize a pattern 214 (such as white balance, focus, and so on) can thus be eliminated or at least significantly reduced.

The inventors have also realized that as the training is not based on real-life, but on the software code module 215, the distribution of different test cases may be controlled so that different use-cases receive equal training, which is a feature that is not available to normal training of image analysis tools.

Figure 3:
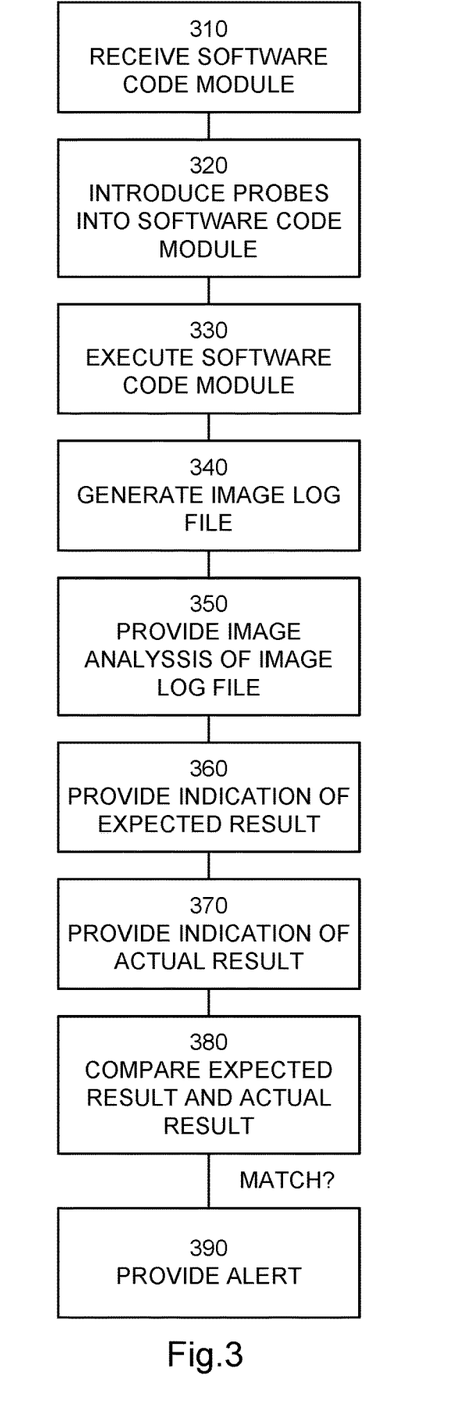
FIG. 3 shows a flowchart of a general method according to an embodiment of the present invention.

FIG. 3 shows a flowchart of a general method according to an embodiment of the teachings herein. The method utilizes a software monitoring arrangement 100 as taught herein. The software monitoring arrangement 100 receives 310 a software code module 215 and introduces 320 a plurality of probes 211 into the software code module 215, each probe 211 being arranged to provide output 212 when executed. The software monitoring arrangement 100 then executes 330 the software code module 215 or causes the software code module to be executed which generates 340 an image log file 213 based on the output 212 of the probes 211. The software monitoring arrangement 100 provides 350 an image analysis 221 of the image log file 213 of a suitable format as discussed in the above which provides 360 an indication 222 of an expected behavior based on the image analysis 221. The software monitoring arrangement 100 also receives 370 an indication 216 of an actual behavior and compares 380 the expected behavior as indicated by its indicator 222 to the actual behavior as indicated by its indicator 216, and, if there is a mismatch, the software monitoring arrangement 100 provides 390 an alert 231.

Figure 4:
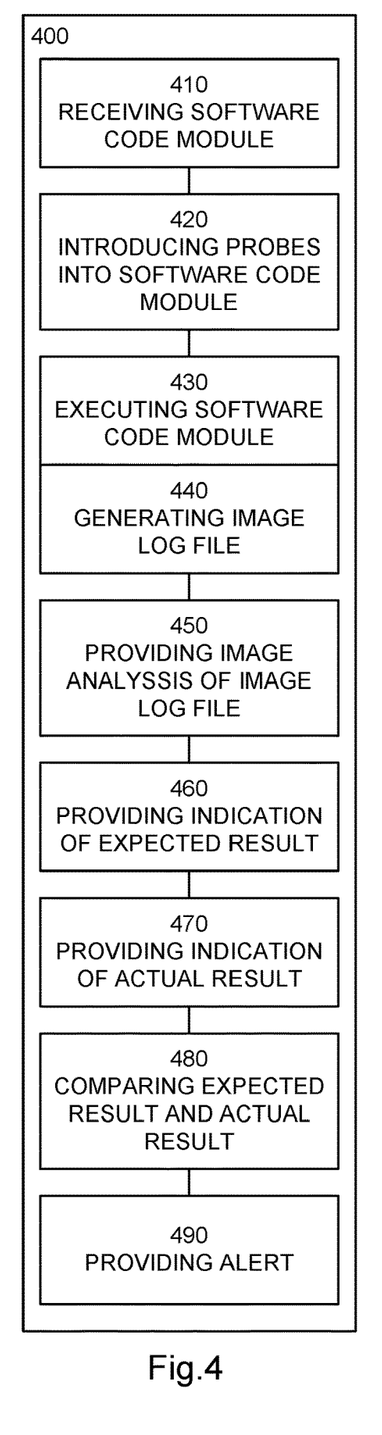
FIG. 4 shows a component view for a software component arrangement according to an embodiment of the teachings herein.

FIG. 4 shows a component view for a software component (or module) arrangement 400 according to an embodiment of the teachings herein. The software component arrangement 400 is adapted to be used in a software monitoring arrangement 100 as taught herein for automated software monitoring as taught herein The software component arrangement 400 comprises a software component for receiving 410 a software code module 215. The software component arrangement 400 also comprises a software component for introducing 420 a plurality of probes 211 into the software code module 215, each probe 211 being arranged to provide output 212 when executed. The software component arrangement 400 also comprises a software component for executing 430 the software code module 215 and for generating 440 an image log file 213 based on the output 212 of the probes 211. The software component arrangement 400 also comprises a software component for providing 450 image analysis 221 of the image log file 213 and a software component for providing 460 an indication 222 of an expected behavior based on the image analysis 221. The software component arrangement 400 also comprises a software component for receiving 470 an indication 216 of an actual behavior and a software component for comparing 480 the expected behavior as indicated by its indicator 222 to the actual behavior as indicated by its indicator 216. The software component arrangement 400 also comprises a software component for providing 490 an alert 231 if there is a mismatch.

Figure 5:
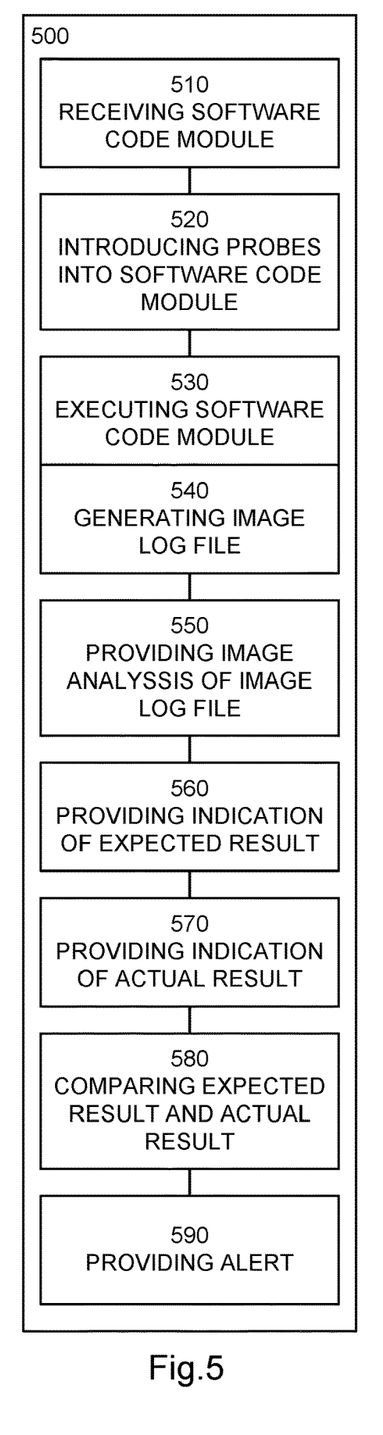
FIG. 5 shows a component view for an arrangement comprising circuits according to an embodiment of the teachings herein.

FIG. 5 shows a component view for an arrangement comprising circuitry for software monitoring 500 according to an embodiment of the teachings herein. The arrangement comprising circuitry for software monitoring 500 is adapted to be used in a software monitoring arrangement 100 as taught herein for automated software monitoring.

The arrangement comprising circuitry for automated software monitoring 500 of FIG. 5 comprises a circuitry for receiving 510 a software code module 215. The arrangement comprising circuitry for automated software monitoring 500 also comprises a circuitry for introducing 520 a plurality of probes 211 into the software code module 215, each probe 211 being arranged to provide output 212 when executed. The arrangement comprising circuitry for automated software monitoring 500 also comprises a circuitry for executing 530 the software code module 215 and for generating 540 an image log file 213 based on the output 212 of the probes 211. The arrangement comprising circuitry for automated software monitoring 500 also comprises a circuitry for providing 550 image analysis 221 of the image log file 213 and a circuitry for providing 560 an indication 222 of an expected behavior based on the image analysis 221. The arrangement comprising circuitry for automated software monitoring 500 also comprises a circuitry for receiving 570 an indication 216 of an actual behavior and a circuitry for comparing 580 the expected behavior as indicated by its indicator 222 to the actual behavior as indicated by its indicator 216. The arrangement comprising circuitry for automated software monitoring 500 also comprises a circuitry for providing 590 an alert 231 if there is a mismatch.

Figure 6:
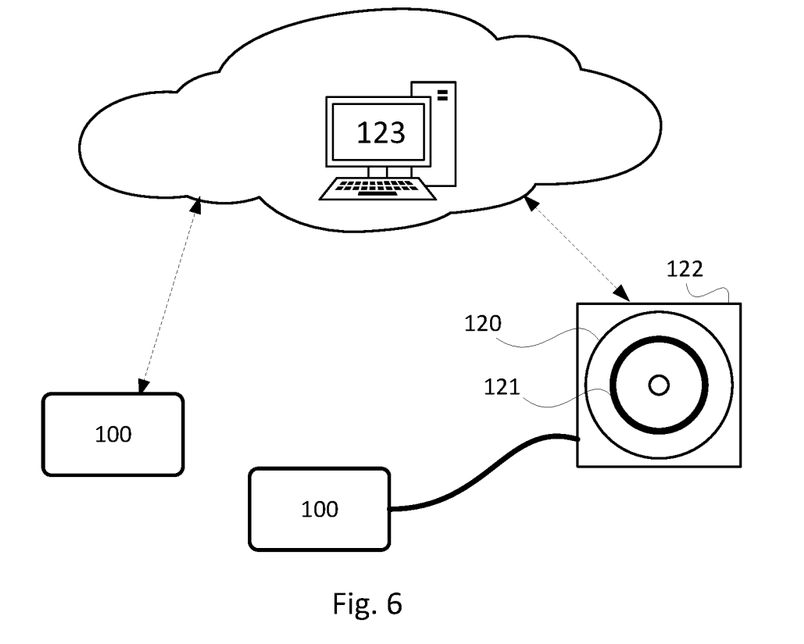
FIG. 6 shows a schematic view of a computer-readable medium carrying computer instructions that when loaded into and executed by a controller of an arrangement enables the arrangement to implement an embodiment of the present invention.

FIG. 6 shows a schematic view of a computer-readable medium 120 carrying computer instructions 121 that when loaded into and executed by a controller of a software monitoring arrangement 100 enables the software monitoring arrangement 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the software monitoring arrangement 100 for being executed by the controller 101.

The computer disc reader 122 may also or alternatively be connected to (or possibly inserted into) a software monitoring arrangement 100 for transferring the computer-readable computer instructions 121 to a controller of the software monitoring arrangement (presumably via a memory of the software monitoring arrangement 100).

FIG. 6 shows both the situation when a software monitoring arrangement 100 receives the computer-readable computer instructions 121 via a wireless server connection (non-tangible) and the situation when another software monitoring arrangement 100 receives the computer-readable computer instructions 121 through a wired interface (tangible). This enables for computer-readable computer instructions 121 being downloaded into a software monitoring arrangement 100 thereby enabling the software monitoring arrangement 100 to operate according to and implement the invention as disclosed herein.

The invention claimed is:

1. A software monitoring arrangement comprising a controller configured to:
    a) receive a first software code module;
    b) introduce a first plurality of probes into the first software code module, wherein each probe of the first plurality of probes is arranged to produce an output when executed;
    c) execute the first software code module;
    d) generate a first image log file based on the output of the first plurality of probes;
    e) provide a first image analysis of the first image log file, wherein the first image analysis of the first image log file is performed by an image analysis tool based on a neural network;
    f) train the image analysis tool after introducing the first plurality of probes into the first software code module;
    g) adjust at least one probe of the first plurality of probes to produce an output providing a higher success rate of the first image analysis of the first image log file performed by the image analysis tool during the training;
    h) provide a first indicator of an expected behavior of the first software code module based on the first image analysis of the first image log file;
    i) receive a first indicator of an actual behavior of the first software code module;
    j) compare the expected behavior of the first software code module as indicated by the first indicator to the actual behavior of the first software code module as indicated by the first indicator; and
    k) provide an alert based on a result of the comparison.

2. The software monitoring arrangement according to claim 1, wherein the output of the first plurality of probes relates to a characteristic of the first image log file.

3. The software monitoring arrangement according to claim 1, wherein the controller is further configured to provide the first image analysis of the first image log file to recognize a pattern in the first image log file, which the pattern in the first image log file is associated with the expected behavior of the first software code module.

4. The software monitoring arrangement according to claim 3, wherein the controller is further configured to:
    recognize a first pattern, which the first pattern is associated with a first expected behavior of the first software code module;
    recognize a second pattern, which the second pattern is associated with a second expected behavior of the first software code module; and
    provide a first indication of the first expected behavior of the first software code module and a second indication of the second expected behavior of the first software code module.

5. The software monitoring arrangement according to claim 1, wherein the controller is further configured to:
    a1) receive a second software code module;
    b1) introduce a second plurality of probes into the second software code module, wherein each probe of the second plurality of probes is arranged to produce an output when executed;
    c1) execute the second software code module;
    d1) generate a second image log file based on the output of the second plurality of probes;
    e1) provide a second image analysis of the second image log file, wherein the second image analysis of the second image log file is performed by the image analysis tool based on the neural network;
    f1) train the image analysis tool after introducing the second plurality of probes into the second software code module;
    g1) adjust at least one probe of the second plurality of probes to produce an output providing a higher success rate of the second image analysis of the second image log file performed by the image analysis tool during the training;
    h1) provide a second indicator of another expected behavior of the first software code module based on the second image analysis of the second image log file;
    i1) compare the expected behavior of the first software code module as indicated by the first indicator and the other expected behavior of the first software code module as indicated by the second indicator to the actual behavior of the first software code module as indicated by the first indicator; and
    j1) provide an alert based on a result of the comparison.

6. The software monitoring arrangement according to claim 1, wherein the first image analysis of the first image log file is performed by the image analysis tool based on object detection.

7. The software monitoring arrangement according to claim 6, wherein the object detection is based on a Deep Neural Network model.

8. A method for automated software monitoring in a software monitoring arrangement, wherein the method comprises:
    a) receiving a software code module;
    b) introducing a plurality of probes into the software code module, wherein each probe of the plurality of probes is arranged to produce an output when executed;
    c) executing the software code module;
    d) generating an image log file based on the output of the plurality of probes;
    e) providing an image analysis of the image log file, wherein the image analysis of the image log file is performed by an image analysis tool based on a neural network;
    f) training the image analysis tool after introducing the plurality of probes into the software code module;
    g) adjusting at least one probe of the plurality of probes to produce an output providing a higher success rate of the image analysis of the image log file performed by the image analysis tool during the training;
    h) providing an indicator of an expected behavior of the software code module based on the image analysis of the image log file;
    i) receiving an indicator of an actual behavior of the software code module;
    j) comparing the expected behavior of the software code module as indicated by the indicator to the actual behavior of the software code module as indicated by the indicator; and
    k) providing an alert based on a result of the comparison.

9. A non-transitory computer-readable medium storing computer instructions that, when loaded into and executed by a controller of a software monitoring arrangement, enables the software monitoring arrangement to:
    a) receive a software code module;
    b) introduce a plurality of probes into the software code module, wherein each probe of the plurality of probes is arranged to produce an output when executed;
    c) execute the software code module;
    d) generate an image log file based on the output of the plurality of probes;

e) provide an image analysis of the image log file, wherein the image analysis of the image log file is performed by an image analysis tool based on a neural network;
f) train the image analysis tool after introducing the plurality of probes into the software code module;
g) adjust at least one probe of the plurality of probes to produce an output providing a higher success rate of the image analysis of the image log file performed by the image analysis tool during the training;
h) provide an indicator of an expected behavior of the software code module based on the image analysis of the image log file;
i) receive an indicator of an actual behavior of the software code module;
j) compare the expected behavior of the software code module as indicated by the indicator to the actual behavior of the software code module as indicated by the indicator; and
k) provide an alert based on a result of the comparison.

10. A software monitoring arrangement comprising circuitry for automated software monitoring comprising:
a) a circuitry for receiving a software code module;
b) a circuitry for introducing a plurality of probes into the software code module, wherein each probe of the plurality of probes is arranged to produce an output when executed;
c) a circuitry for executing the software code module;
d) a circuitry for generating an image log file based on the output of the plurality of probes;
e) a circuitry for providing an image analysis of the image log file, wherein the image analysis of the image log file is performed by an image analysis tool based on a neural network;
f) a circuitry for training the image analysis tool after introducing the plurality of probes into the software code module;
g) a circuitry for adjusting at least one probe of the plurality of probes to produce an output providing a higher success rate of the image analysis of the image log file performed by the image analysis tool during the training;
h) a circuitry for providing an indicator of an expected behavior of the software code module based on the image analysis of the image log file;
i) a circuitry for receiving an indicator of an actual behavior of the software code module;
j) a circuitry for comparing the expected behavior of the software code module as indicated by the indicator to the actual behavior of the software code module as indicated by the indicator; and
k) a circuitry for providing an alert based on a result of the comparison.

* * * * *